(12) United States Patent
Katayama et al.

(10) Patent No.: US 10,418,826 B2
(45) Date of Patent: Sep. 17, 2019

(54) BATTERY DEVICE AND CHARGING DEVICE

(71) Applicant: MAKITA CORPORATION, Anjo-shi, Aichi (JP)

(72) Inventors: Junichi Katayama, Anjo (JP); Masafumi Noda, Anjo (JP); Tadahiko Kobayakawa, Anjo (JP)

(73) Assignee: MAKITA CORPORATION, Aichi (JP)

( * ) Notice: Subject to any disclaimer, the term of this patent is extended or adjusted under 35 U.S.C. 154(b) by 342 days.

(21) Appl. No.: 15/361,210

(22) Filed: Nov. 25, 2016

(65) Prior Publication Data

US 2017/0155254 A1    Jun. 1, 2017

(30) Foreign Application Priority Data

Nov. 30, 2015 (JP) ................................ 2015-234015
Aug. 10, 2016 (JP) ................................ 2016-158027

(51) Int. Cl.
| | |
|---|---|
| *H02J 7/00* | (2006.01) |
| *H01M 10/44* | (2006.01) |
| *H02J 7/04* | (2006.01) |
| *H01M 10/42* | (2006.01) |

(52) U.S. Cl.
CPC ......... *H02J 7/0021* (2013.01); *H01M 10/443* (2013.01); *H02J 7/007* (2013.01); *H02J 7/0029* (2013.01); *H02J 7/0044* (2013.01); *H02J 7/0077* (2013.01); *H02J 7/0091* (2013.01); *H02J 7/042* (2013.01); *H01M 2010/4278* (2013.01); *H02J 7/0004* (2013.01); *H02J 2007/0037* (2013.01)

(58) Field of Classification Search
CPC .................................................. H02J 7/0021
USPC ............................................................ 320/107
See application file for complete search history.

(56) References Cited

U.S. PATENT DOCUMENTS

| | | | |
|---|---|---|---|
| 5,534,765 A | 7/1996 | Kreisinger et al. | |
| 5,872,444 A | 2/1999 | Nagano et al. | |
| 5,905,362 A | 5/1999 | Nagano et al. | |
| 6,075,347 A * | 6/2000 | Sakakibara | H02J 7/0091 320/150 |
| 6,404,167 B1 * | 6/2002 | Sakakibara | H02J 7/0047 320/130 |
| 9,166,442 B1 | 10/2015 | Belch et al. | |

(Continued)

FOREIGN PATENT DOCUMENTS

| | | |
|---|---|---|
| EP | 1882997 A1 | 1/2008 |
| EP | 2 173 003 A1 | 4/2010 |

(Continued)

OTHER PUBLICATIONS

Feb. 15, 2017 Extended Search Report issued in European Patent Application No. 16200991.4.
Mar. 23, 2018 Office Action issued in European Patent Application No. 16200991.4.
Sep. 7, 2018 Office Action issued in European Patent Application No. 16200991.4.

(Continued)

*Primary Examiner* — Jerry D Robbins
(74) *Attorney, Agent, or Firm* — Oliff PLC

(57) ABSTRACT

A battery device having a chargeable and dischargeable battery; a detection unit that detects a state of the battery; and a control unit. The control unit calculates a value of a maximum charging current that can be supplied to the battery during charging of the battery on the basis of the state of the battery detected by the detection unit, and notifies a result of such calculation to a charging device.

20 Claims, 11 Drawing Sheets

(56) References Cited

U.S. PATENT DOCUMENTS

| | | | |
|---|---|---|---|
| 2001/0017531 A1 | 8/2001 | Sakakibara et al. | |
| 2004/0070369 A1* | 4/2004 | Sakakibara | B25F 5/00 320/128 |
| 2005/0179410 A1* | 8/2005 | Jeong | G11B 19/20 318/66 |
| 2006/0103348 A1* | 5/2006 | Melichar | G01R 31/3651 320/116 |
| 2008/0030172 A1 | 2/2008 | Darzy | |
| 2008/0315834 A1* | 12/2008 | Cruise | H02J 7/0006 320/113 |
| 2010/0085020 A1* | 4/2010 | Suzuki | B25F 5/00 320/157 |
| 2010/0141207 A1 | 6/2010 | Phillips et al. | |
| 2012/0004875 A1 | 1/2012 | Maeda et al. | |
| 2012/0229078 A1 | 9/2012 | Mack et al. | |
| 2014/0019074 A1* | 1/2014 | Noda | G01R 31/3648 702/63 |
| 2015/0180249 A1* | 6/2015 | Jeon | H02J 5/005 320/108 |

FOREIGN PATENT DOCUMENTS

| | | |
|---|---|---|
| JP | H09285026 A | 10/1997 |
| WO | 94/21022 A1 | 9/1994 |

OTHER PUBLICATIONS

Feb. 18, 2019 Ofifce Action issued in European Patent Application No. 16 200 991.4.

* cited by examiner

BATTERY DEVICE AND CHARGING DEVICE

CROSS-REFERENCE TO RELATED APPLICATIONS

This application claims the benefits of Japanese Patent Application No. 2015-234015 filed on Nov. 30, 2015 with the Japan Patent Office and Japanese Patent Application No. 2016-158027 filed on Aug. 10, 2016 with the Japan Patent Office, the disclosures of which are incorporated herein by reference.

BACKGROUND

The present disclosure relates to a battery device comprising a chargeable and dischargeable battery, and to a charging device that charges the battery.

A charging device disclosed in Japanese Unexamined Patent Application Publication No. H9-285026 charges a battery within a battery pack. The charging device obtains a value of a maximum charging current from the battery pack before starting charging and, during the charging, controls a charging current to the battery so as not to exceed the maximum charging current.

SUMMARY

The value of the maximum charging current that can be supplied to the battery varies according to a state of the battery (for example, temperature, voltage, and so on of the battery). However, in the above-described battery pack, a fixed value of the maximum charging current is stored. When charging the battery, the charging device reads the fixed value of the maximum charging current from the battery pack before starting the charging.

This may lead to a situation in which the fixed value of the maximum charging current used by the charging device to limit the charging current to the battery is not a current value corresponding to the state of the battery at the time.

In one aspect of the present disclosure, it is preferred that a charging device can set a charging current during charging of a battery on the basis of a state of the battery.

A battery device in one aspect of the present disclosure comprises a battery configured to be chargeable and dischargeable; a detection unit configured to detect a state of the battery; and a control unit.

The control unit calculates, on the basis of the state of the battery detected by the detection unit, a value of a maximum charging current that can be supplied to the battery during charging of the battery, and notifies a result of such calculation to a charging device.

Thus, the charging device can control a charging current to the battery during charging of the battery on the basis of the value of the maximum charging current corresponding to the state of the battery at the time.

Consequently, with the battery device of the present disclosure, high-speed charging can be performed while seeking to prolong life of the battery.

Here, the detection unit may be configured to detect at least one of a battery voltage or a battery temperature as the state of the battery. With such a configuration, the control unit calculates the value of the maximum charging current on the basis of the battery voltage and/or the battery temperature, which change from moment to moment during charging of the battery, and notifies the calculated value of the maximum charging current to the charging device. This enables the charging device to limit the charging current properly according to such changes.

Further, the detection unit may be configured to detect a usage history of the battery as the state of the battery. This enables the control unit to calculate the value of the maximum charging current on the basis of the usage history (in other words, a deterioration state) of the battery. Thus, the charging device can limit the charging current properly on the basis of the deterioration state of the battery.

On the other hand, the control unit may be configured to transmit to the charging device digital data indicating the value of the maximum charging current, or may be configured to output to the charging device at least one analog signal in which a voltage value varies according to the value of the maximum charging current.

In the case where the control unit outputs the at least one analog signal, if the at least one analog signal is outputted through a filter that reduces a high frequency noise, such as a switching noise generated by the charging device and so on, the value of the maximum charging current can be accurately notified to the charging device.

In the case where the at least one analog signal is outputted as described above, the control unit may be configured to set the voltage value in the at least one analog signal indicating the value of the maximum charging current, in a range narrower than a range of an input voltage of the charging device. This enables the at least one analog signal outputted from the control unit in the battery device to be inputted directly to the charging device, and thus, such a signal path can be simplified.

The control unit may be configured to set the voltage value in the at least one analog signal to be outputted, using a function having the value of the maximum charging current as a variable. This enables the control unit to calculate the voltage value in the at least one analog signal from the value of the maximum charging current using the specified function, and thus, operation by the control unit can be simplified extremely.

The control unit may be configured to notify to the charging device a parameter required to convert the voltage value in the at least one analog signal to the value of the maximum charging current. This enables the charging device to detect the value of the maximum charging current using the voltage value in the at least one analog signal inputted from the battery device and such a conversion parameter.

In this case, for example, even when a battery device having a larger maximum charging current than existing ones is developed, the battery device can notify a proper value of the maximum charging current to the charging device, while allowing a voltage range of the at least one analog signal to correspond to the range of the input voltage of the charging device. Accordingly, battery devices having different specifications can be charged by the common charging device.

Next, the control unit may be configured to set the voltage value in the at least one analog signal to be outputted to the charging device by using a linear function having the value of the maximum charging current as a variable. This enables the control unit to calculate the voltage value in the at least one analog signal using the linear function, and thus, operation by the control unit can be further simplified.

In the case where the control unit transmits the conversion parameter to the charging device as described above, it is enough to only transmit at least one parameter indicating a slope and/or an intercept of the linear function. Thus, notification of the conversion parameter also can be simplified. If the intercept is constant, only the parameter indicating the slope may be transmitted.

Next, it may be configured such that the conversion parameter as described above is notified from the charging device to the battery. In this case, the control unit sets the voltage value in the at least one analog signal to be outputted to the charging device using the parameter obtained from the charging device, whereby the control unit can properly notify the value of the maximum charging current to the charging device.

Even when a charging device having a larger chargeable current that can be outputted during charging of the battery than existing ones is developed, the battery device can set the voltage value in the at least one analog signal corresponding to the coupled charging device, and can notify the value of the maximum charging current.

The above-described conversion parameter may be notified by each of the battery device and the charging device. In this case, the battery device can generate the at least one analog signal having a proper voltage value corresponding to the charging device, whereas the charging device can grasp the value of the maximum charging current that can be supplied to the battery device from the voltage value in the at least one analog signal obtained from the battery device, and can control the charging current to the battery.

The control unit may output, to the charging device, a plurality of correction analog signals having different voltage values as the at least one analog signal, and may obtain detection data of the voltage values in the plurality of correction analog signals detected by the charging device after such output, from the charging device by at least one digital signal.

In this case, the control unit may calculate at least one correction value for correcting the voltage value in the at least one analog signal so that the obtained detection data become data indicating a specified voltage value, and may correct the voltage value in the at least one analog signal using the at least one correction value when the at least one analog signal indicating the value of the maximum charging current is outputted.

This enables the battery device to notify the value of the maximum charging current to the charging device more accurately.

The control unit may be configured to output to the charging device each of the at least one analog signal in which the voltage value varies according to the value of the maximum charging current and the at least one digital signal indicating the value of the maximum charging current.

This enables the charging device to select the value of the maximum charging current that can limit the charging current to the battery more optimally, from the values of the maximum charging current obtained from the at least one analog signal and the at least one digital signal.

In the case where the value of the maximum charging current is notified to the charging device using the at least one digital signal as described above, a value of a minimum charging current to be supplied to the battery during charging of the battery may also be notified to the charging device using the at least one digital signal.

This can inhibit the charging current flowing during charging of the battery from falling below the value of the minimum charging current, and charging of the battery can thereby be performed more successfully.

On the other hand, a charging device of another aspect of the present disclosure comprises: a charging power-supply unit capable of controlling a charging current to a battery; and a control unit that controls the charging current to be supplied from the charging power-supply unit to the battery.

The control unit controls the charging current on the basis of a value of a maximum charging current notified from a battery device provided with the battery.

Accordingly, when used to charge the battery in the above-described battery device of the present disclosure, the charging device can charge the battery with a proper charging current on the basis of the value of the maximum charging current notified from the battery device. As a result, it becomes possible to prolong life of the battery and to charge the battery rapidly.

Next, the control unit in the charging device may be configured to calculate the value of the maximum charging current from a voltage value in at least one analog signal inputted from the battery device.

This enables the control unit in the charging device to obtain the value of the maximum charging current from the battery device without being affected by a high frequency noise, such as a switching noise, during charging of the battery, and thus, charging of the battery can be performed properly.

In this case, the control unit in the charging device may be configured to notify to the battery device a conversional parameter required for calculating the value of the maximum charging current from the voltage value in the at least one analog signal.

This enables the battery device, when outputting the at least one analog signal indicating the value of the maximum charging current, to set the voltage value to a voltage value that enables accurate calculation of the value of the maximum charging current in the charging device. Thus, the control unit in the charging device can calculate the value of the maximum charging current accurately.

Next, the control unit in the charging device may be configured, when at least one correction analog signal is inputted from the battery device, to notify detection data of a voltage value in the at least one correction analog signal to the battery device using at least one digital signal.

In the case where the battery device is configured to output the above-described at least one correction analog signal, the above-described configuration makes it possible to detect the value of the maximum charging current more accurately from the at least one analog signal inputted from the battery device, by notifying the detection data of the voltage value to the battery device.

The control unit in the charging device may be configured: to obtain the value of the maximum charging current from the at least one analog signal inputted from the battery device; to obtain the value of the maximum charging current from the at least one digital signal inputted from the battery device; and to control the charging current on the basis of one of the obtained values of the maximum charging current.

In this case, when the charging current is controlled on the basis of a smaller value of the obtained two kinds of values of the maximum charging current, an upper limit of the charging current to the battery can be controlled more successfully.

The control unit in the charging device may be configured: to obtain a value of a minimum charging current from the at least one digital signal inputted from the battery device; and to control the charging current on the basis of the value of the minimum charging current.

This can inhibit the charging current flowing during charging of the battery from falling below the value of the minimum charging current notified from the battery device, to thereby enable more successful charging of the battery.

The charging device may further comprise a state detection unit configured to detect a state of the charging device. In this connection, the control unit may be configured to control the charging current on the basis of the state of the charging device detected by the state detection unit, in a range not exceeding the value of the maximum charging current notified from the battery device.

This enables the charging device to limit the charging current on the basis of the state of the charging device itself, during charging of the battery. Thus, deterioration of the charging device caused by charging of the battery can be inhibited.

Here, the state detection unit in the charging device may be configured to detect a temperature within the charging device or a temperature of a component provided to the charging device. This can inhibit the charging device from deteriorating due to abnormal rise in temperature of the charging device during charging of the battery.

The state detection unit in the charging device may be configured to detect a power-supply voltage supplied from an external power supply to the charging device.

Specifically, in a case where the power-supply voltage supplied from the external power supply is low, it is necessary to increase an input current from the external power supply in order to ensure electric power for supplying a desired charging current to the battery. However, when the input current from the external power supply is increased as just described, an amount of heat generation in a primary-side component that receive power supply from the external power supply is increased.

Thus, with the above-described configuration in which the state detection unit detects the power-supply voltage supplied from the external power supply, the control unit can detect, from the detected power-supply voltage, increase in the input current and, further, rise in temperature of the charging device. In this way, the control unit can control the charging current to the battery on the basis of a result of such detection.

BRIEF DESCRIPTION OF THE DRAWINGS

Example embodiments of the present disclosure will be described below, by way of example, with reference to the accompanying drawings, in which.

DETAILED DESCRIPTION OF THE PREFERRED EMBODIMENTS

Figure 1:
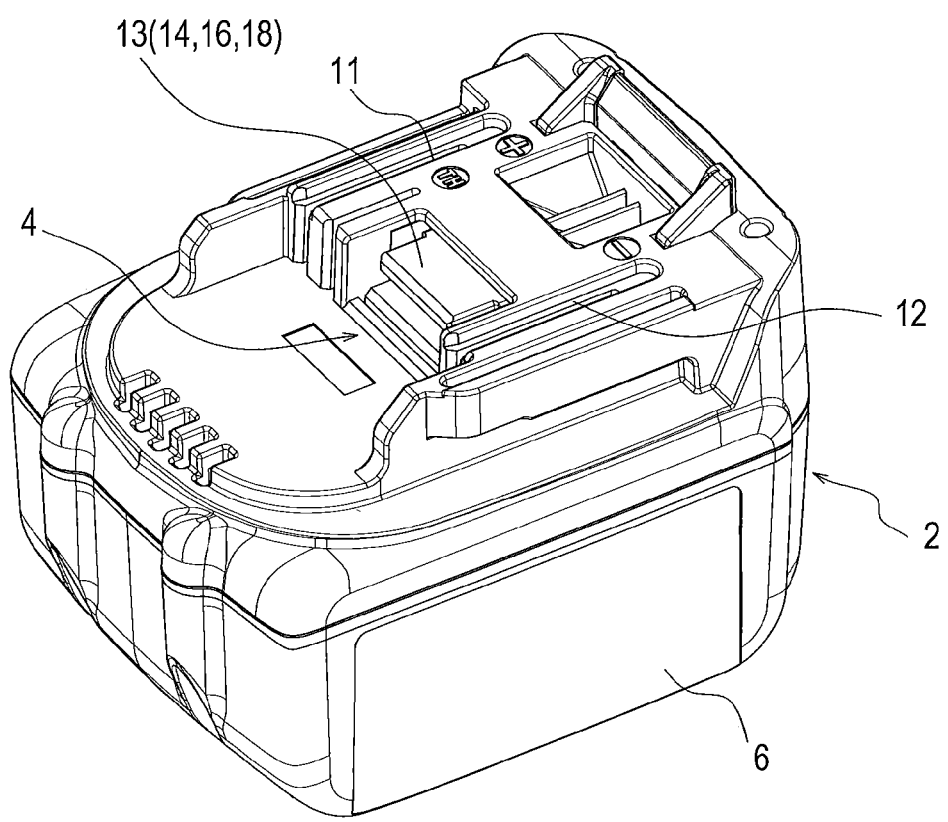
FIG. 1 is a perspective view showing an external appearance of a battery pack of an embodiment.
Figure 2:
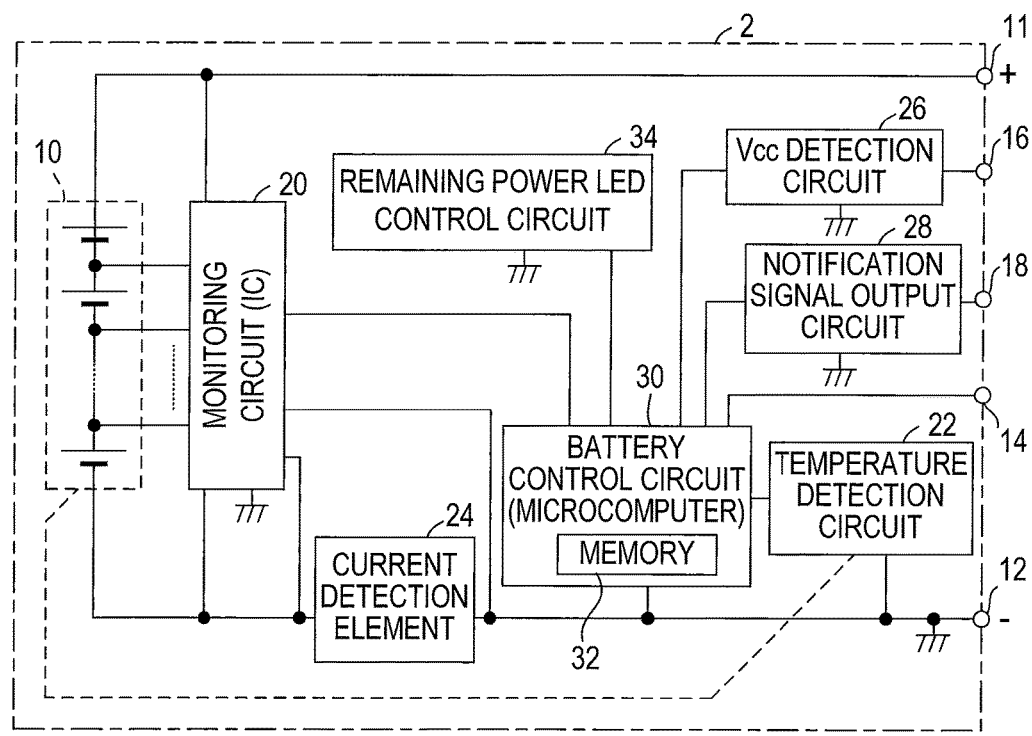
FIG. 2 is a block diagram showing a circuit configuration of the battery pack of the embodiment.
Figure 3:
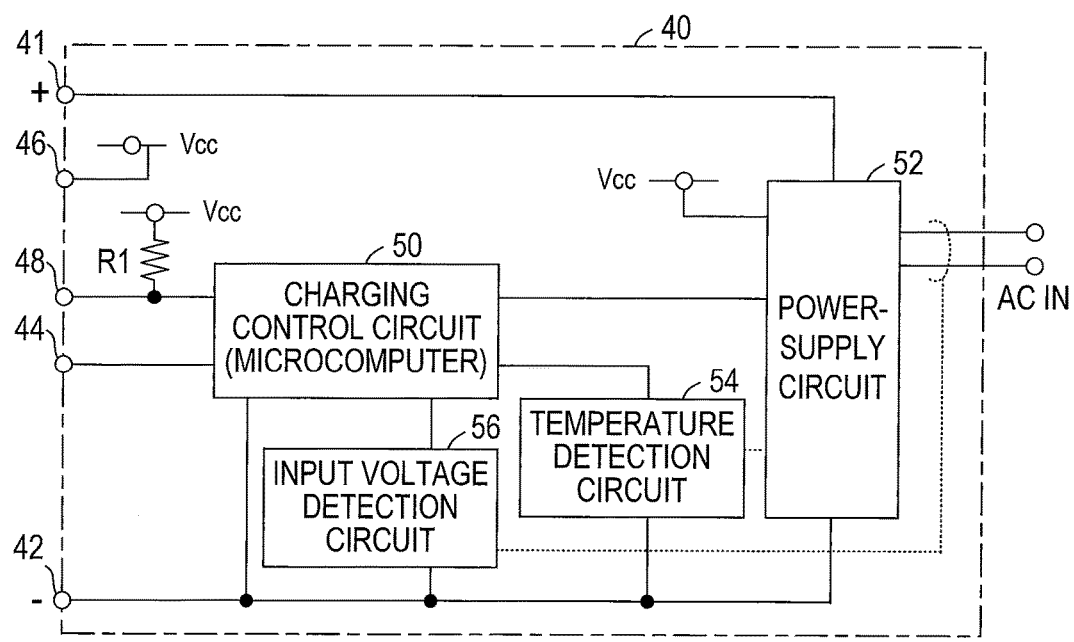
FIG. 3 is a block diagram showing a circuit configuration of a charging device that charges a battery.

As shown in FIG. 1, a battery pack 2 of the present example embodiment is a battery device comprising a case 6 provided with an attachment portion 4 for attachment to a charging device 40 in FIG. 3 or a not-shown electric power tool. The case 6 contains a battery 10 (for example, a lithium-ion battery) shown in FIG. 2, which is chargeable and dischargeable.

The attachment portion 4 of the battery pack 2 comprises a pair of positive and negative power-supply terminals 11 and 12 for charging and discharging of the battery 10, and a terminal portion 13 comprising a plurality of terminals for inputting and outputting signals from and to the charging device 40 or the electric power tool.

As shown in FIG. 2, the terminal portion 13 comprises a communication terminal 14, an input terminal 16, and an output terminal 18. The communication terminal 14 is used to communicate with the charging device 40 or the electric power tool. The input terminal 16 is used to take in a power-supply voltage Vcc (for example, direct current 5 [V]) from the charging device 40. The output terminal 18 is used to notify a value of a maximum charging current to the charging device 40.

As shown in FIG. 2, the battery 10, which is chargeable and dischargeable, comprises a plurality of cells connected in series. A positive side of the battery 10 is coupled to the power-supply terminal 11, and a negative side is coupled to the power-supply terminal 12.

The battery pack 2 contains a monitoring circuit 20 that monitors a voltage between both ends of the battery 10 (hereinafter referred to as a battery voltage) and/or a voltage of each cell, and a temperature detection circuit 22 that detects a temperature of at least one of the cells of the battery 10. The monitoring circuit 20 may, by way of example, comprise an integrated circuit. The temperature detection circuit 22 comprises, for example, a thermistor in which a value of resistance varies according to a temperature, or the like.

Provided in a current path between the negative side of the battery 10 and the power-supply terminal 12 is, for example, a current detection element 24 comprising a resistor. The monitoring circuit 20 takes in a voltage between the both ends of the current detection element 24 to thereby monitor a battery current flowing during charging and discharging of the battery 10.

A result of monitoring by the monitoring circuit 20 (for example, the battery voltage, the battery current, and so on), and a result of detection by the temperature detection circuit 22 (for example, the battery temperature) are inputted to a battery control circuit 30.

The battery control circuit 30 comprises a one-chip microcomputer comprising a CPU, a ROM, a RAM, and so on; and a non-volatile memory 32 that stores various information.

The battery pack 2 further comprises a Vcc detection circuit 26, a notification signal output circuit 28, and a remaining power LED control circuit 34. The respective circuits are coupled to the battery control circuit 30.

The Vcc detection circuit 26 detects the power-supply voltage Vcc inputted from the charging device 40 to the input terminal 16, and a result of the detection is inputted to the battery control circuit 30.

The notification signal output circuit 28 generates, in accordance with a command from the battery control circuit 30, an analog signal having a voltage value indicating the value of the maximum charging current that can be supplied to the battery 10 as a maximum charging current value notification signal. Then, the notification signal output circuit 28 outputs the generated notification signal to the charging device 40 through the output terminal 18. The notification signal output circuit 28 is provided with a low-pass filter that removes a noise superimposed on an output path of the notification signal.

The remaining power LED control circuit 34 controls a lighting state of at least one LED for indicating a remaining power in accordance with a command from the battery control circuit 30 to thereby indicate the remaining power of the battery 10. The remaining power refers to an amount of electricity remaining in the battery 10 (in other words, a remaining amount of charge).

Next, provided to the charging device 40 is a not-shown attachment portion that can be fitted to the attachment portion 4 of the battery pack 2.

As shown in FIG. 3, the attachment portion of the charging device 40 comprises power-supply terminals 41 and 42, a communication terminal 44, an output terminal 46, and an input terminal 48, which are respectively connected to the respective terminals 11, 12, 14, 16, and 18 of the battery pack 2 when the battery pack 2 is attached to the charging device 40.

The charging device 40 comprises a power-supply circuit 52 that generates a charging voltage required to charge the battery 10 on the basis of an alternating-current power from an external power supply (for example, a commercial power supply or the like) and that outputs the generated charging voltage to the power-supply terminals 41 and 42. The charging device 40 further comprises a charging control circuit 50 that controls output from the power-supply circuit 52.

The charging control circuit 50 comprises a microcomputer similarly to the battery control circuit 30.

When the battery pack 2 is coupled (or connected or attached) to the charging device 40, the charging control circuit 50 communicates with the battery control circuit 30 coupled thereto through the communication terminals 44 and 14, to thereby control charging of the battery 10.

During the charging of the battery 10, the charging control circuit 50 detects the value of the maximum charging current that can be supplied to the battery 10 on the basis of the notification signal inputted to the input terminal 48 of the charging device 40 through the output terminal 18 of the battery pack 2. Then, the charging control circuit 50 controls a charging current for charging the battery 10 so as not to exceed the value of the maximum charging current.

An input path of the notification signal from the input terminal 48 to the charging control circuit 50 is coupled to a power-supply line within the charging device 40 via a resistor R1. A power-supply voltage supplied from the power-supply line is referred to as Vcc.

Thus, when the battery pack 2 is not coupled to the charging device 40, a voltage value of the notification signal inputted to the charging control circuit 50 from the input terminal 48 is equal to a voltage value of the power-supply voltage Vcc. In this way, the charging control circuit 50 can detect that the battery pack 2 is not coupled from a voltage value in the notification signal.

On the other hand, the notification signal output circuit 28 in the battery pack 2 outputs, in accordance with a command from the battery control circuit 30, an analog signal indicating the value of the maximum charging current (in other words, the notification signal), the voltage value of which varies in a range narrower than a range of an input voltage that can be inputted to the charging control circuit 50 (more specifically, zero to Vcc).

Figure 4:
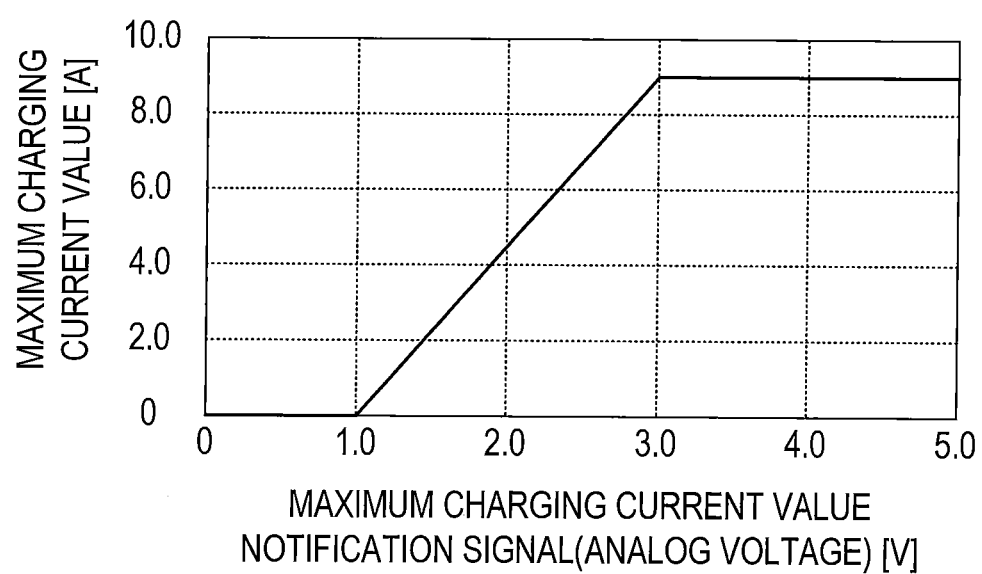
FIG. 4 is an explanatory diagram showing a relationship between a value of a maximum charging current to the battery and a notification signal.

Assuming, for example, that the value of the maximum charging current that can be supplied to the battery 10 varies from 0 [A] to 9 [A] according to a battery state, then the battery control circuit 30 sets the voltage value in the notification signal in accordance with a voltage-current conversion characteristic shown in FIG. 4, and causes the notification signal output circuit 28 to output the notification signal.

Specifically, the battery control circuit 30 sets the voltage value in the notification signal indicating the smallest value 0 [A] of the maximum charging current to a voltage value 1 [V], which is larger than the smallest voltage 0 [V] in the range of the input voltage. Further, the battery control circuit 30 sets the voltage value in the notification signal indicating the largest value 9 [A] of the maximum charging current to a voltage value 3 [V], which is smaller than the largest voltage in the range of the input voltage, i.e., the power-supply voltage Vcc (for example, direct current 5 [V]). As for a current from the smallest value to the largest value of the maximum charging current, the battery control circuit 30 sets the voltage value in the notification signal such that the voltage value varies linearly in proportion to the value of the maximum charging current in a range between the lowest voltage 1 [V] and the highest voltage 3 [V].

Figure 5:
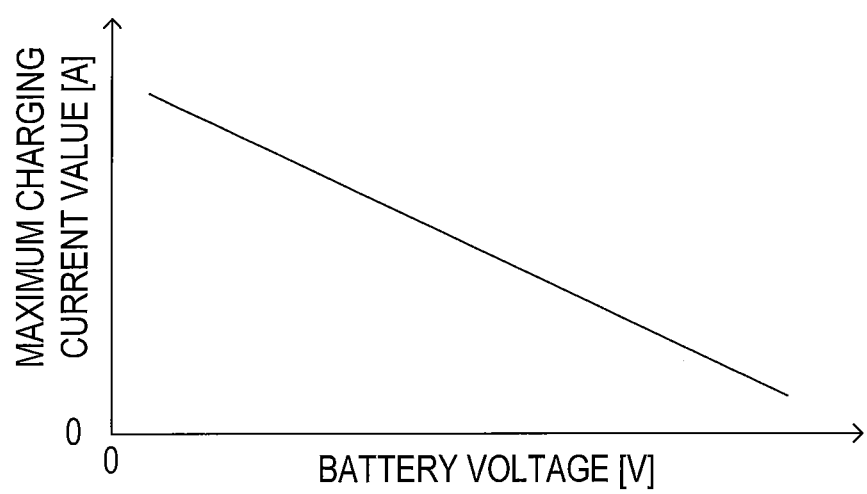
FIG. 5 is an explanatory diagram showing a relationship between a battery voltage and the value of the maximum charging current.

Thus, the battery control circuit 30 may calculate the voltage value in the notification signal by assigning the value of the maximum charging current set on the basis of the battery state in accordance with a setting characteristic exemplified in FIG. 5 to a linear function having the value of the maximum charging current as a variable. By way of example, the battery state in FIG. 5 is the battery voltage.

Further, the battery control circuit 30 may cause the notification signal output circuit 28 to output information different from the value of the maximum charging current, by using the voltage value in a voltage range (for example, 0 to 1 [V] or 3 to 5 [V]) that is out of a voltage range of the maximum charging current value notification signal.

Next, the power-supply circuit 52 in the charging device 40 not only generates the charging voltage for the battery 10, but also generates the power-supply voltage Vcc (for example, direct current 5 [V]) for the charging control circuit 50. The power-supply voltage Vcc generated by the power-supply circuit 52 is outputted to the input terminal 16 of the battery pack 2 through the output terminal 46.

Thus, in the battery pack 2, the Vcc detection circuit 26 detects that the power-supply voltage Vcc in the charging device 40 is applied to the input terminal 16, and it can thereby be detected that the battery pack 2 is coupled to the charging device 40.

The charging device 40 further comprises a temperature detection circuit 54 that detects a temperature of the power-supply circuit 52, and an input voltage detection circuit 56 that detects an input voltage from the external power supply in a contactless manner. Detection signals from the respective detection circuits 54 and 56 are inputted to the charging control circuit 50.

When the temperature detected by the temperature detection circuit 54 is high and/or when the input voltage detected by the input voltage detection circuit 56 is low, the charging control circuit 50 suppresses the charging current to the battery 10.

When the alternating-current input voltage from the external power supply is low, a current flowing through an external power supply side primary circuit of the power-supply circuit 52 is increased, resulting in a higher likelihood of a rise in temperature.

Thus, the charging control circuit 50 suppresses the charging current to the battery 10 when the power-supply circuit 52 used to charge the battery 10 has risen in temperature or is likely to rise in temperature. This can inhibit the power-supply circuit 52 (in other words, the charging device 40) from rising in temperature and from being deteriorated.

Next, an explanation will be given about control processes performed by the battery control circuit 30 in the battery pack 2 and by the charging control circuit 50 in the charging device 40 to charge the battery 10.

The battery control circuit 30 operates using the battery voltage. However, when the battery voltage is decreased, the battery control circuit 30 operates using the power-supply voltage Vcc inputted from the charging device 40 through the input terminal 16. The battery control circuit 30 repeatedly performs the battery control process shown in FIG. 6.

Figure 6:
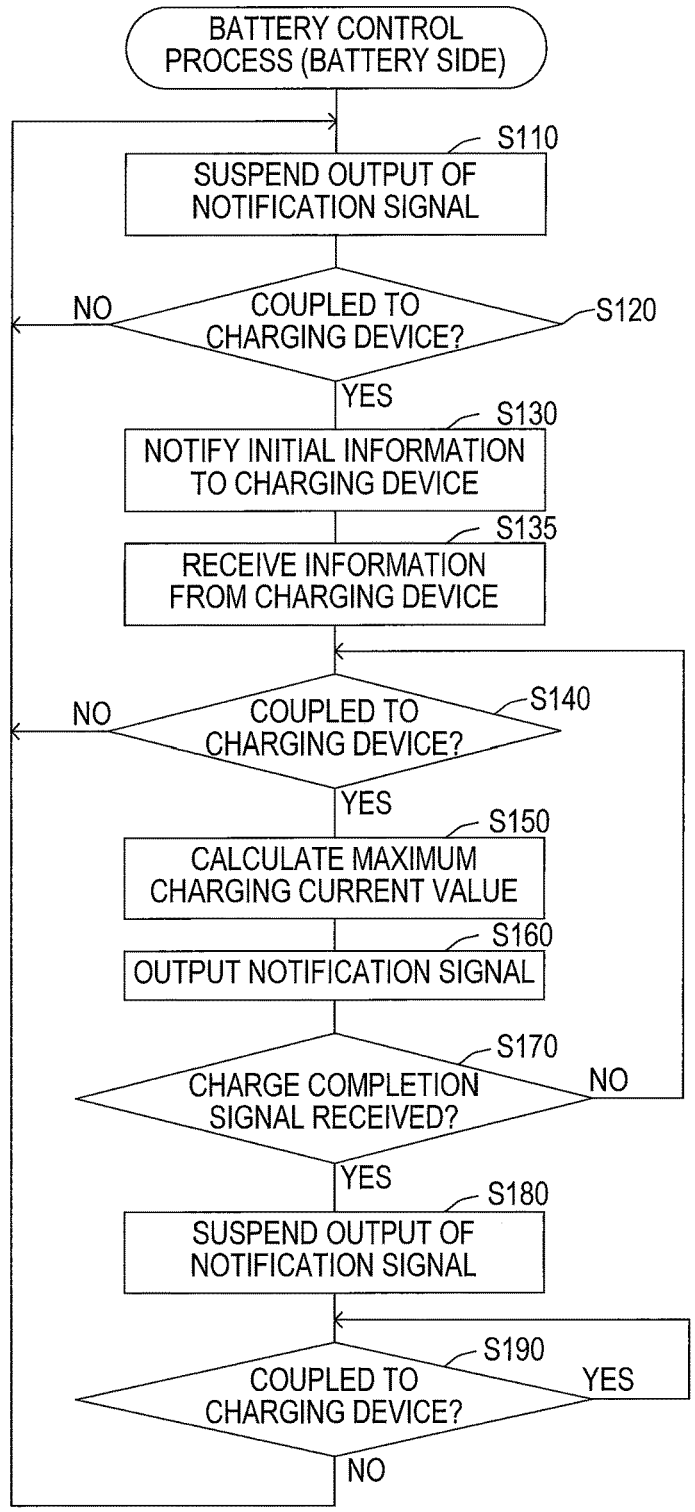
FIG. 6 is a flowchart showing a battery control process performed by a battery control circuit.

The battery control process shown in FIG. 6 is a process for causing the charging device 40 to charge the battery 10 when the battery pack 2 is coupled to the charging device 40.

When the battery control process is started, in S110, the battery control circuit 30 first suspends output of the notification signal from the notification signal output circuit 28. Such suspension of output may be performed by setting an output voltage from the notification signal output circuit 28 to a voltage value (for example, 0 [V]) that is smaller than the voltage range (more specifically, 1 [V] to 3 [V]) of the value of the maximum charging current shown in FIG. 4.

Next, in S120, the battery control circuit 30 determines whether the battery pack 2 is coupled to the charging device 40, on the basis of a detection signal from the Vcc detection circuit 26. If the battery pack 2 is determined not to be coupled to the charging device 40, the process shifts to S110.

If the battery pack 2 is determined to be coupled to the charging device 40 in S120, the process shifts to S130, where the battery control circuit 30 notifies initial information on the battery 10 to the charging control circuit 50 in the charging device 40. Such notification may be performed by transmitting digital data indicating a maximum capacity, a usage history, and so on of the battery 10 to the charging device 40 through the communication terminal 14.

The usage history of the battery 10 may be, for example, a history of charge and/or discharge of the battery 10, such as the number of charges, the number of discharges, charging time, discharging time, and so on. The usage history of the battery 10 is stored in the non-volatile memory 32, and may be updated each time charge or discharge of the battery 10 is performed.

After the battery control circuit 30 notifies the initial information on the battery 10 in S130, the process shifts to S135, where the battery control circuit 30 receives information transmitted from the charging device 40, through the communication terminal 14. Such information may be information indicating a specification or a charging capacity of the charging device 40, and may include, for example, an upper limit of a chargeable current that can be supplied to the battery 10 by the charging device 40.

Subsequently, in S140, the battery control circuit 30 determines whether the battery pack 2 is coupled to the charging device 40 similarly to S120. If the battery pack 2 is determined not to be coupled to the charging device 40, the process shifts to S110. If the battery pack 2 is determined to be coupled to the charging device 40, the process shifts to S150, where the battery control circuit 30 calculates the value of the maximum charging current.

Such calculation of the value of the maximum charging current in S150 is performed on the basis of at least one of the battery voltage detected by the monitoring circuit 20, cell voltages of the respective cells constituting the battery 10, the battery temperature detected by the temperature detection circuit 22, or the usage history of the battery 10 stored in the non-volatile memory 32.

In S150, for example, the battery control circuit 30 may calculate a reference value of the maximum charging current on the basis of the battery voltage on the basis of a map exemplified in FIG. 5, such that the lower the battery voltage is, the larger the value of the maximum charging current is. Then, the battery control circuit 30 may calculate the value of the maximum charging current by correcting the reference value on the basis of at least one of variation in the cell voltages, a difference of the battery temperature from a standard temperature, or the usage history.

After the value of the maximum charging current is calculated as above in S150 on the basis of a state of the battery 10 at the time, the process shifts to S160, where the battery control circuit 30 causes the notification signal output circuit 28 to output the notification signal indicating the value of the maximum charging current.

The voltage value in the notification signal may be calculated using the function explained with reference to FIG. 4 (the linear function by way of example) or using the map.

When setting the voltage value in the notification signal in S160, the battery control circuit 30 may set the value of the maximum charging current to the upper limit of the chargeable current if the value of the maximum charging current calculated in S150 is larger than the upper limit of the chargeable current of the charging device 40 received in S135.

This makes it possible to inhibit a situation in which the value of the maximum charging current that is larger than the upper limit of the chargeable current is notified to the charging device 40 and the charging device 40 allows the charging current larger than the upper limit to flow thereby to cause a problem such as heat generation.

Subsequently, in S170, the battery control circuit 30 determines whether a charge completion signal outputted from the charging device 40 has been received. If the charge completion signal is determined not to have been received, the process shifts to S140. If the charge completion signal is determined to have been received, the process shifts to S180.

The charge completion signal is transmitted through the communication terminal 44 of the charging device 40 when the charging control circuit 50 determines that charging of the battery 10 has been completed.

Next, in S180, since the charging of the battery 10 has already been completed, the battery control circuit 30 suspends output of the notification signal from the notification signal output circuit 28, and the process shifts to S190.

In S190, the battery control circuit 30 determines whether the battery pack 2 is coupled to the charging device 40 similarly to S120 or S140. If the battery pack 2 is determined to be coupled to the charging device 40, the battery control circuit 30 performs S190 again and waits for the battery pack 2 to be detached from the charging device 40.

In S190, if the battery pack 2 is determined not to be coupled to the charging device 40 (in other words, if the battery pack 2 is determined to have been detached from the charging device 40), the process shifts to S110, and the battery control circuit 30 performs the battery control process again in the above-described manner.

Figure 7:
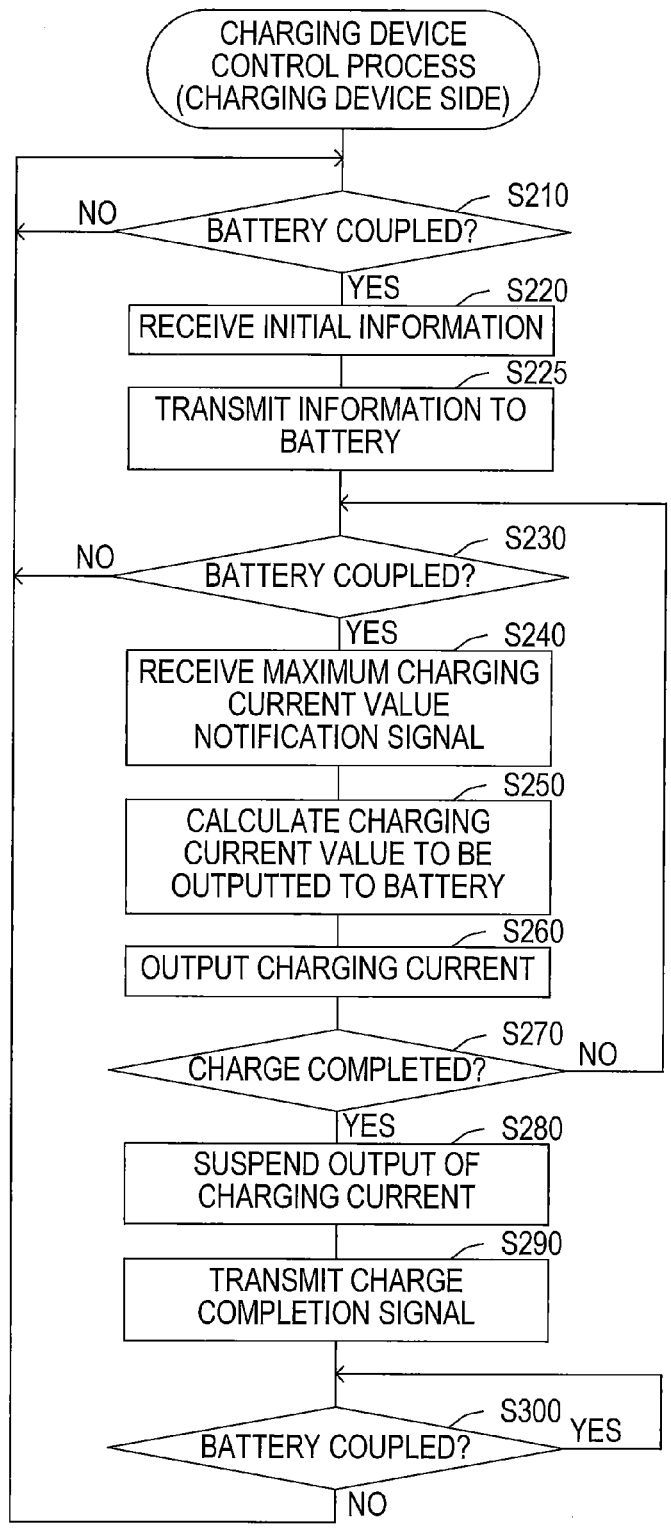
FIG. 7 is a flowchart showing a charging device control process performed by a charging control circuit.

Next, the charging control circuit 50 operates using the power-supply voltage Vcc generated by the power-supply circuit 52, and repeatedly performs the charging device control process shown in FIG. 7.

The charging device control process shown in FIG. 7 is performed to charge the battery 10 when the battery pack 2 is coupled to the charging device 40. When the control process is started, the charging control circuit 50 determines in S210 whether the battery pack 2 is coupled to the charging device 40.

In this process, it may be determined, for example, whether a voltage at the input terminal 48 is lower than the power-supply voltage Vcc. If the voltage at the input terminal 48 is determined to be the power-supply voltage Vcc, the input terminal 48 is in an open state, i.e., the battery pack 2 is not coupled. In this case, the charging control circuit 50 may perform S210 again and wait for the battery pack 2 to be coupled.

Next, in S210, if the battery pack 2 is determined to be coupled to the charging device 40, the process shifts to S220, where the charging control circuit 50 receives the initial information on the battery 10 transmitted from the battery pack 2, and the process shifts to S225.

In S225, the charging control circuit 50 transmits information indicating, for example, the specification or the charging capacity of the charging device 40, such as the above-described upper limit of the chargeable current, to the battery pack 2 through the communication terminal 44.

Next, in S230, the charging control circuit 50 determines whether the battery pack 2 is coupled to the charging device 40, similarly to S210. If the charging control circuit 50 determines that the battery pack 2 is not coupled to the charging device 40 (in other words, if the battery pack 2 is determined to have been detached from the charging device 40), the process shifts to S210.

If the battery pack 2 is determined to be coupled to the charging device 40 in S230, the process shifts to S240, where the charging control circuit 50 receives the notification signal transmitted from the battery pack 2 through the input terminal 48.

Subsequently, in S250, the charging control circuit 50 obtains the value of the maximum charging current that can be supplied to the battery 10 from the voltage value in the notification signal received in S240, and calculates a value of the charging current to the battery 10 so that the charging current to the battery 10 does not exceed the value of the maximum charging current.

When calculating the value of the maximum charging current from the voltage value in the notification signal in S250, a voltage-current conversion map having the same characteristic as that shown in FIG. 4 or an arithmetic expression (a linear function by way of example) may be used.

Alternatively, in the calculation of the value of the charging current in S250, for example, the initial information on the battery 10 (the maximum capacity, the usage history, and so on, by way of example) received in S220, the detection signal from the temperature detection circuit 54 and/or the input voltage detection circuit 56, the battery voltage obtained from the power-supply circuit 52, and so on may be used.

That is, in S250, the charging control circuit 50 calculates, on the basis of these parameters, the value of the charging current for charging the battery 10 while inhibiting overheating of the power-supply circuit 52. The value of the charging current, whose upper limit is the value of the maximum charging current, is set as a value of a current to be outputted from the power-supply circuit 52.

In this way, upon calculating the value of the charging current to the battery 10 in S250, the process shifts to S260, where the charging control circuit 50 controls the power-supply circuit 52 such that the charging current to be supplied from the power-supply circuit 52 to the battery 10 corresponds to the value of the charging current calculated in S250.

In S260, the power-supply circuit 52 is controlled such that the charging current may not exceed the value of the maximum charging current. However, in a case where a switching noise occurs due to a switching control for a current control, it may be acceptable that the value of charging current exceeds the value of the maximum charging current.

This is because the switching noise that occurs instantaneously at a frequency (for example, a few kHz) similar to a frequency in the switching control is smoothed by a capacity component of the battery 10 and/or a charging path. Thus, the switching noise does not cause deterioration of the battery 10.

However, in a case where the value of the charging current to the battery 10 is periodically changed and the control is performed so that an average current becomes a desired charging current, the value of the charging current set by such change should not exceed the value of the maximum charging current.

Next, in S270, the charging control circuit 50 determines whether the charging of the battery 10 has been completed from the battery voltage and/or the value of the charging current. If the charging of the battery 10 is determined not to have been completed, the process shifts to S230. If the charging of the battery 10 is determined to have been completed, the process shifts to S280, where the charging control circuit 50 suspends output of the charging current from the power-supply circuit 52.

Subsequently, in S290, the charging control circuit 50 transmits the charge completion signal through the communication terminal 44 to thereby notify to the battery pack 2 that the charging has been completed, and the process shifts to S300.

In S300, the charging control circuit 50 determines whether the battery pack 2 is coupled to the charging device 40, similarly to S210 or S230. If the battery pack 2 is determined to be coupled to the charging device 40, the charging control circuit 50 performs S300 again and waits for the battery pack 2 to be detached from the charging device 40.

In S300, if the battery pack 2 is determined not to be coupled to the charging device 40 (in other words, if the battery pack 2 is determined to have been detached from the charging device 40), the process shifts to S210, and the charging control circuit 50 performs the charging device control process again in the above-described manner.

As explained so far, in the present embodiment, when the battery pack 2 is attached to the charging device 40, the battery control circuit 30 notifies to the charging device 40 the information on the battery 10 (for example, the maximum capacity, the usage history, and so on) as the initial information before start of the charging.

Subsequently, the battery control circuit 30 calculates the value of the maximum charging current that can be supplied to the battery 10 on the basis of the state of the battery 10 (for example, the temperature, the voltage, the usage history, and so on). Then, the battery control circuit 30 notifies a result of the calculation to the charging device 40 using the analog notification signal. Such calculation and notification of the value of the maximum charging current are repeatedly performed until the battery pack 2 is detached from the charging device 40 or until the charging of the battery 10 by the charging device 40 is completed.

This makes it possible for the charging device 40 to limit the charging current, when charging the battery 10, on the basis of the value of the maximum charging current corresponding to the state of the battery 10 varying with the charging.

Thus, with the battery pack 2 and the charging device 40 of the present embodiment, it is possible to inhibit an excess current from flowing through the battery 10, to thereby seek to prolong life of the battery 10. In addition, high-speed charging can be performed without excessively suppressing the charging current to the battery 10.

When charging the battery 10, the charging control circuit 50 in the charging device 40 sets the value of the charging current on the basis of, for example, the initial information obtained from the battery pack 2 (for example, the maximum capacity, the usage history, and so on), the battery voltage, the temperature of the power-supply circuit 52, the input voltage from the external power supply, and so on.

Then, the charging control circuit 50 controls output from the power-supply circuit 52 so that the charging current to be supplied from the power-supply circuit 52 to the battery 10 may become the set value of the charging current and also may not exceed the value of the maximum charging current notified from the battery pack 2.

Thus, with the charging device 40 of the present embodiment, it is possible not only to protect the battery 10 from the excess current but also to inhibit the power-supply circuit 52 that supplies the charging current from being deteriorated due to an overheated state thereof during the charging of the battery 10.

When notifying the initial information on the battery 10 to the charging device 40 before starting the charging, the battery control circuit 30 causes the digital data indicating the initial information to be transmitted through the communication terminal 14. On the other hand, as for the value of the maximum charging current, the battery control circuit 30 causes the analog notification signal to be outputted from the notification signal output circuit 28.

This is because the analog notification signal is a direct-current voltage signal. Specifically, this is because, even when the power-supply circuit 52 performs a switching operation to control the charging current, the analog notification signal becomes not affected by the switching noise generated by the switching operation due to the use of the low-pass filter or the like.

Specifically, in the case where the value of the maximum charging current is transmitted as the digital data through the communication terminal 14, the output of the charging current from the power-supply circuit 52 may be temporarily suspended during such transmission because the digital data is likely to be affected by the switching noise. However, this prolongs time required to charge the battery 10.

Thus, in the present embodiment, when notifying the value of the maximum charging current, the notification signal is utilized in which the voltage value varies according to the value of the current. This makes it possible to notify the value of the maximum charging current without suspending the charging while charging the battery 10.

In the present embodiment, the battery control circuit 30 and the notification signal output circuit 28 in the battery pack 2 correspond to one example of a control unit in a battery device of the present disclosure, and the monitoring circuit 20, the temperature detection circuit 22, the current detection element 24, and the non-volatile memory 32 correspond to one example of a detection unit in the battery device of the present disclosure.

On the other hand, the charging control circuit 50 in the charging device 40 corresponds to one example of a control unit in a charging device of the present disclosure, the power-supply circuit 52 corresponds to one example of a charging power-supply unit of the present disclosure, and the temperature detection circuit 54 and the input voltage detection circuit 56 in the charging device 40 correspond to one example of a state detection unit of the present disclosure.

Although one embodiment of the present disclosure has been described so far, the present disclosure is not limited to the above-described embodiment but can take various forms within a scope not departing from the spirit of the present disclosure.

For example, in the above-described embodiment, upon receipt of the notification signal from the battery pack 2, the charging control circuit 50 in the charging device 40 calculates the value of the maximum charging current from the voltage value in the notification signal using the voltage-current conversion map and/or the arithmetic expression in the process of S250.

The voltage-current conversion map and/or the arithmetic expression may be stored in a memory (for example, a ROM or the like) within the charging control circuit 50. Alternatively, the battery control circuit 30 may notify the voltage-current conversion map and/or the arithmetic expression to the charging control circuit 50.

In this case, when notifying the initial information in the process of S130, the battery control circuit 30 may perform data transmission of the voltage-current conversion map and/or the arithmetic expression to the charging control circuit 50 as a piece of the initial information on the battery 10.

Further, the parameter (i.e., the voltage-current conversion map and/or the arithmetic expression) for calculating the value of the maximum charging current from the voltage value in the notification signal may be notified to the battery control circuit 30 from the charging control circuit 50.

Specifically, when transmitting the information to the battery control circuit 30 in the process of S225, the charging control circuit 50 may transmit the voltage-current conversion map and/or the arithmetic expression.

This enables the battery control circuit 30 to obtain the information (i.e., the voltage-current conversion characteristic of the charging control circuit 50 or the arithmetic expression) in the process of S135 and, in S160, to set the voltage value in the notification signal in accordance with the information.

Assuming, for example, that the upper limit of the chargeable current of the charging device 40 is 15 [A] and that the largest value of the maximum charging current that can be supplied to the battery 10 is 12 [A], then the battery control circuit 30 can set the notification signal such that the value of the maximum charging current corresponding to the largest voltage value in the notification signal is 15 [A].

Alternatively, assuming, for example, that the upper limit of the chargeable current of the charging device 40 is 12 [A] and that the largest value of the maximum charging current that can be supplied to the battery 10 is 15 [A], then the battery control circuit 30 can set the notification signal such that the value of the maximum charging current corresponding to the largest voltage value of the notification signal is 12 [A].

Accordingly, in this case, the battery pack 2 can generate the notification signal in which the upper limit of the chargeable current of the charging device 40 corresponds to the largest voltage value. Thus, the charging device 40 can accurately recognize the value of the maximum charging current to the battery 10 from the voltage value in the notification signal.

In addition, in this case, it is possible to indicate a whole range of the charging current (for example, 0 [A] to 12 [A]) that can be supplied by the charging device 40 by using the voltage range in the notification signal (more specifically, 1 [V] to 3 [V] in the above-described embodiment).

Accordingly, a resolution of the notification signal can be a resolution corresponding to charging characteristics of the charging device 40, and the battery pack 2 can notify the value of the maximum charging current to the charging device 40 more successfully.

The information for calculating the value of the maximum charging current from the voltage value in the notification signal as described above (more specifically, the voltage-current conversion map and/or the arithmetic expression) may be transmitted by each of the battery control circuit 30 and the charging control circuit 50.

In this case, both or one of the battery control circuit 30 and the charging control circuit 50 may automatically adjust the voltage-current conversion characteristics of these circuits so that the characteristics of these circuits match each other. This enables the battery control circuit 30 to accurately notify the value of the maximum charging current of the battery 10 to the charging control circuit 50.

Alternatively, the voltage-current conversion map and/or the arithmetic expression may be transmitted as digital data as they are. However, in the case where the voltage-current conversion map and/or the arithmetic expression can be described by a linear function as in the characteristic shown in FIG. 4, a slope and/or an intercept of the linear function may be transmitted as at least one parameter indicating the voltage-current conversion characteristic.

Still alternatively, for example, multiple types of the battery packs 2 having the same smallest value of the maximum charging current and having the different largest value of the maximum charging current may be charged by the common charging device 40. In this case, only the largest value IP (IP0, IP1, IP2 . . . in FIG. 8 by way of example) of the maximum charging current of each battery pack may be notified to the charging device 40.

Figure 8:
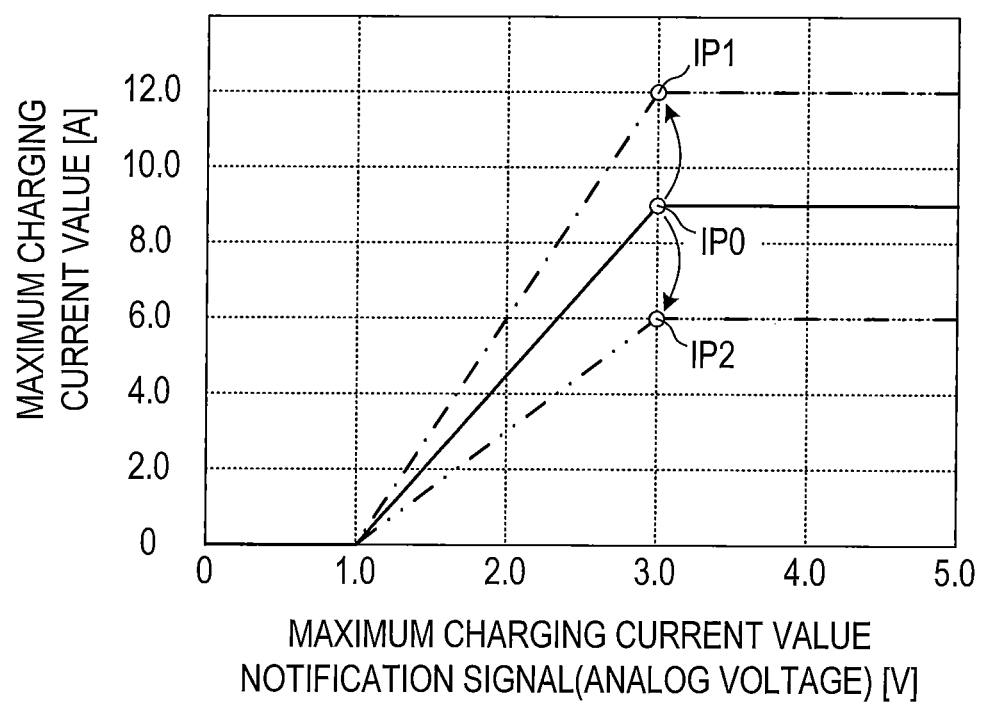
FIG. 8 is an explanatory diagram explaining an operation of changing a voltage-current conversion characteristic in FIG. 4.

Specifically, in the respective voltage-current conversion characteristics of the corresponding battery packs shown in a solid line, a dot-and-dash line, and a dash-dot-dot line in FIG. 8, 0 [A] is indicated as the value of the maximum charging current by the smallest voltage value (1 [V] by way of example) in the notification signal, and each of IP0, IP1, and IP2 is indicated as the value of the maximum charging current by the largest voltage value (3 [V] by way of example) in the notification signal.

In this case, in S160, the battery control circuit 30 in each battery pack may set the voltage value in the notification signal from the value of the maximum charging current on the basis of the corresponding voltage-current conversion characteristic and, in S130, may notify the largest value IP0, IP1, or IP2 of the maximum charging current as a piece of the initial information.

This enables the charging control circuit 50 in the charging device 40 to obtain the largest value IP of the maximum charging current in S220 and to generate the map or the arithmetic expression for calculating the value of the maximum charging current from the obtained largest value IP.

Further, in the case where the upper limit of the chargeable current is notified from the charging device 40 to the battery pack 2 as in the above-described embodiment, in the battery pack 2, the voltage value in the notification signal may be set, in S160, such that the upper limit is the largest value of the maximum charging current. This allows the resolution of the notification signal to be the resolution corresponding to the charging characteristics of the charging device 40.

Next, in the above-described embodiment, the maximum charging current value notification signal is set within the voltage range narrower than the range of the input voltage (0 to Vcc) that can be inputted to the charging control circuit 50. However, the voltage value in the notification signal may be set using the whole range of the input voltage (0 to Vcc).

A relationship between the voltage value in the notification signal and the value of the maximum charging current is not necessarily required to be described by the linear function, but may be described by a function different from the linear function. Alternatively, mutual conversion between the voltage value and the value of the maximum charging current may be performed by interpolation calculation using a map.

In the meantime, the voltage value in the analog signal inputted from the battery pack 2 to the charging device 40 may possibly be deviated from the voltage value set in the battery pack 2, due to variation in the power-supply voltage Vcc in the charging device 40 and/or changes in characteristics of circuit components caused by ambient temperature.

Thus, when the battery pack 2 outputs the analog signal to the charging device 40, the battery pack 2 may correct the voltage value in the analog signal so that the charging device 40 can accurately detect the value of the maximum charging current from the voltage value in the analog signal.

Further, when the value of the maximum charging current is notified from the battery pack 2 to the charging device 40, not only the analog signal is outputted through the output terminal 18, but also a digital signal corresponding to the digital data indicating the value of the maximum charging current may be outputted through the communication terminal 14.

Specifically, the value of the maximum charging current is notified to the charging device 40 in two lines, i.e., using the analog signal and the digital signal, to thereby enable the charging device 40 to restrict the upper limit of the charging current more reliably.

Next, an explanation will be given about operations of the battery control circuit 30 and the charging control circuit 50 in a modified example of the above-described embodiment. In the modified example, the voltage value in the analog signal is corrected in the battery pack 2, and the value of the maximum charging current is notified to the charging device 4 using the analog signal and the digital signal.

Figure 9:
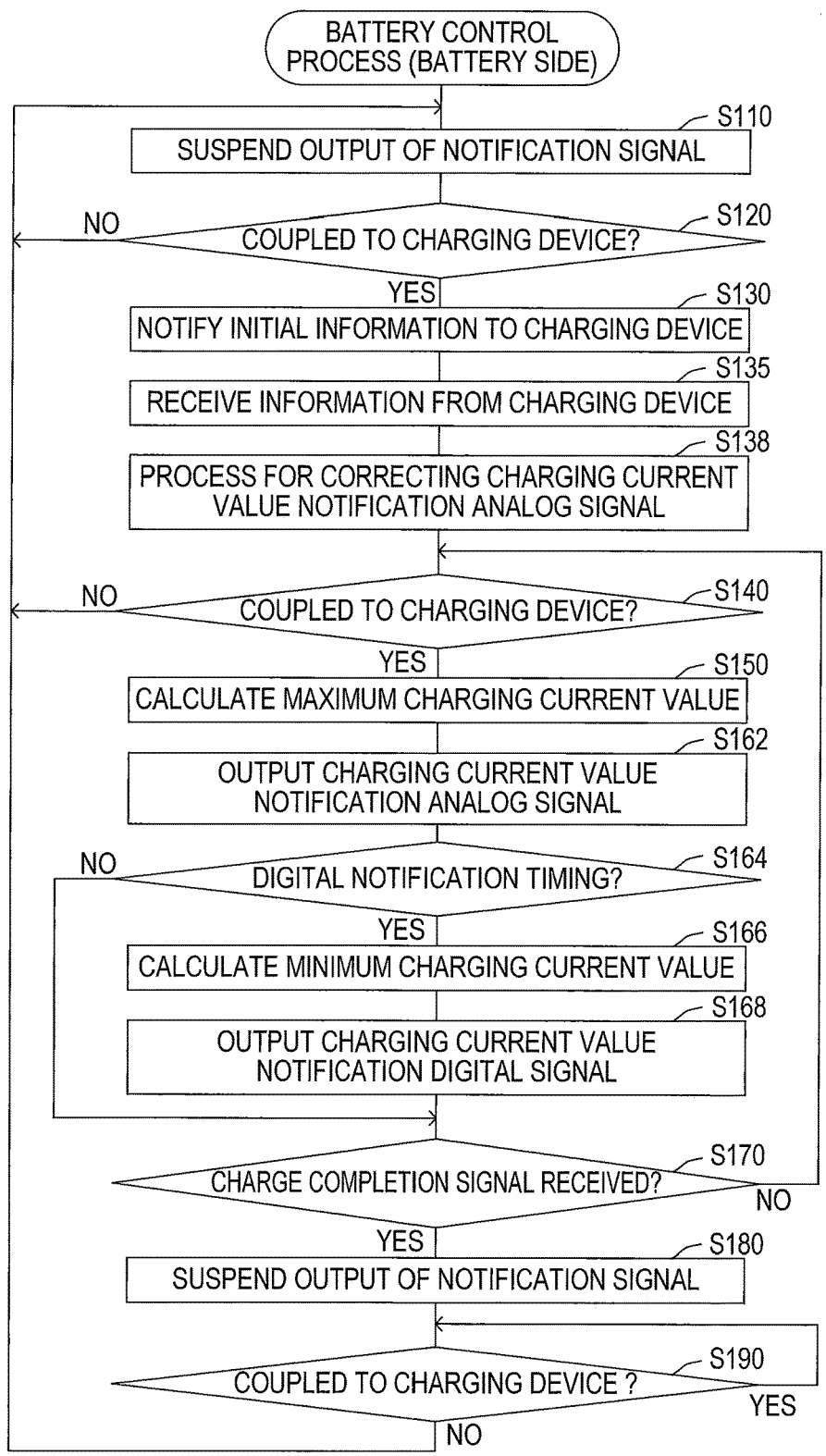
FIG. 9 is a flowchart showing a modified example of the battery control process performed by the battery control circuit.
Figure 10:
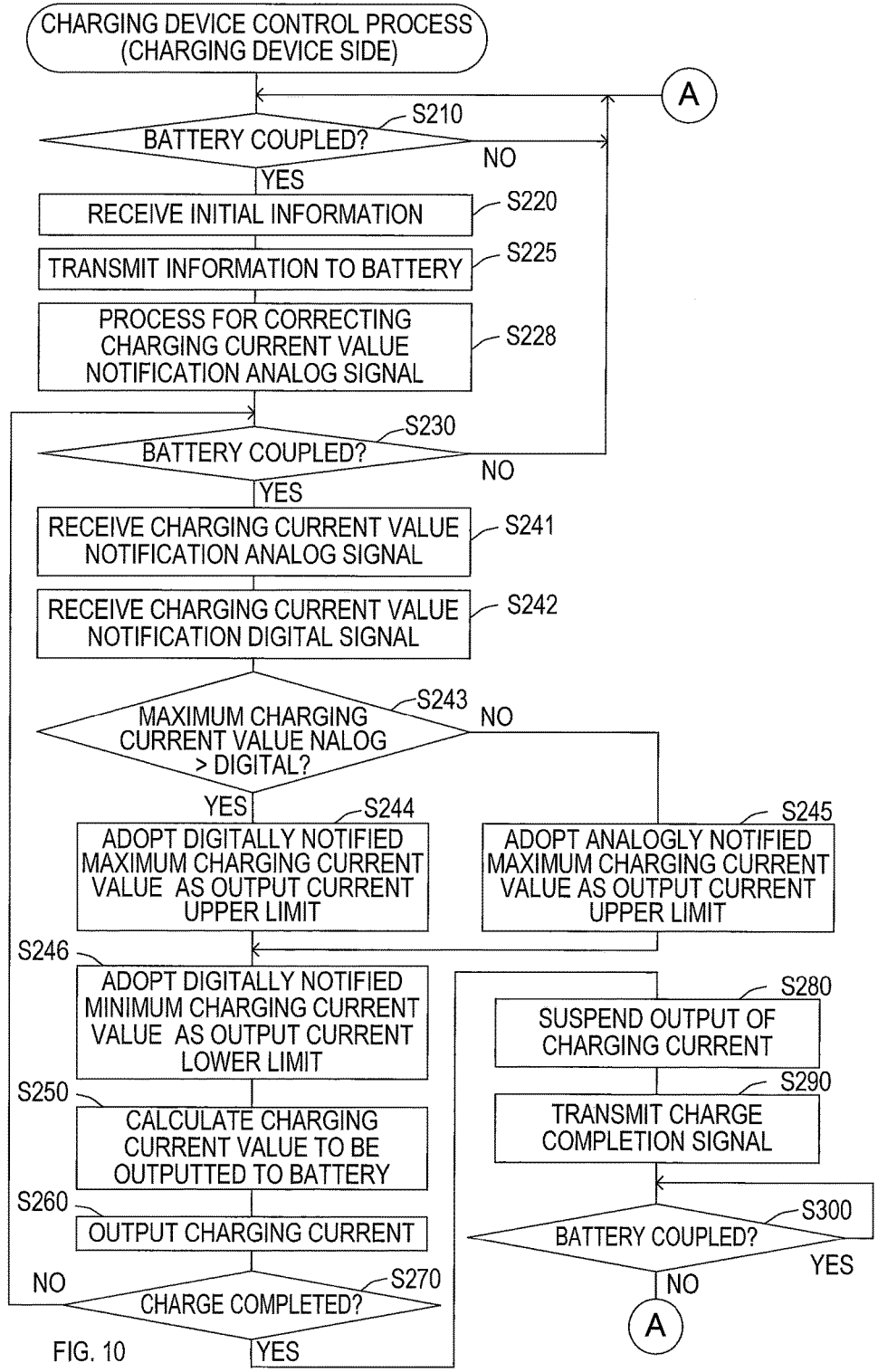
FIG. 10 is a flowchart showing a modified example of the charging device control process performed by the charging control circuit.

FIG. 9 and FIG. 10 show control processes performed by the battery control circuit 30 and the charging control circuit 50 in the present modified example. Basic processing procedures in these control processes are the same as those in the control processes in FIG. 6 and FIG. 7. Thus, in the explanation below, differences of the control processes in FIG. 9 and FIG. 10 from the control processes in FIG. 6 and FIG. 7 will be explained, and explanation of each process similar to that in FIG. 6 and FIG. 7 will be omitted.

As shown in FIG. 9, upon receipt of the information transmitted from the charging device 40 in S135, the process shifts to S138, where the battery control circuit 30 performs a process for correcting a charging current value notification analog signal.

The process of S138 is performed correspondingly to the process of S228 (more specifically, the process for correcting the charging current value notification analog signal) to be performed after the process of S225 is performed in the charging device control process by the charging control circuit 50 shown in FIG. 10.

Figure 11:
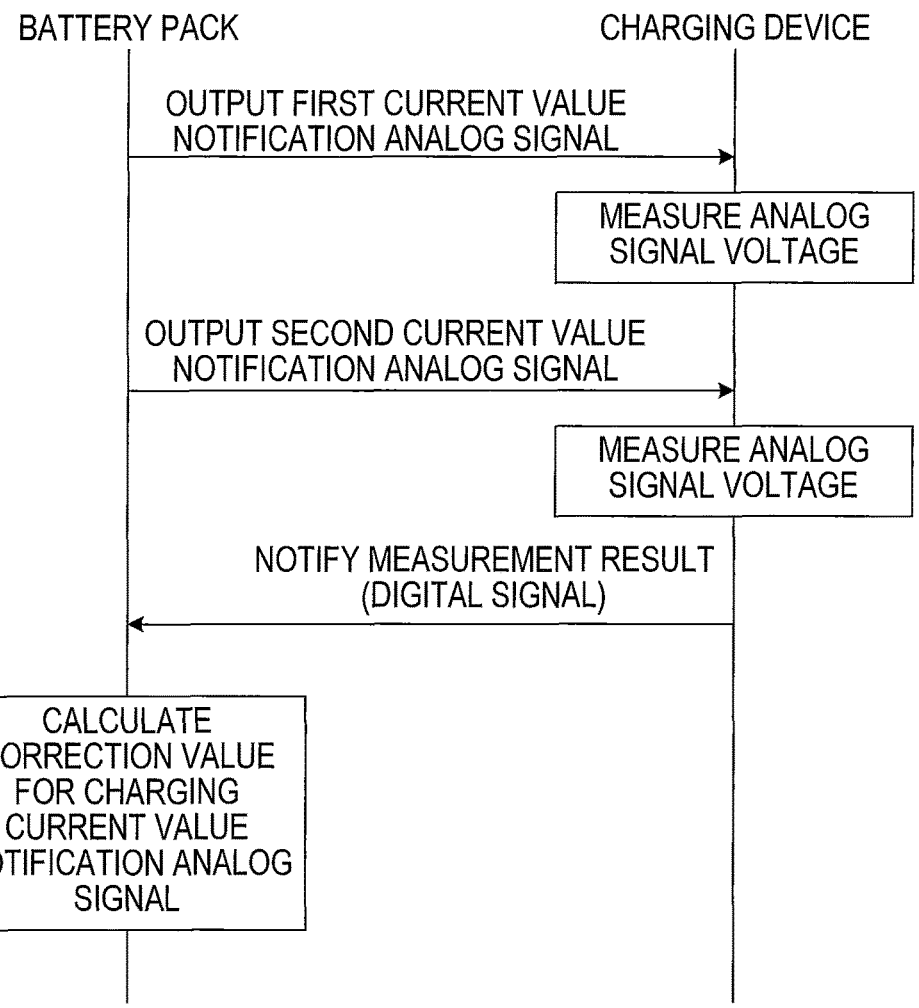
FIG. 11 is an explanatory diagram showing details of a process for correcting a charging current value notification analog signal, which process is shown in FIG. 9 and FIG. 10.

As shown in FIG. 11, in the process for correcting the charging current value notification analog signal in S138 and S228, the battery control circuit 30 first causes two kinds of correction analog signals set to different voltage values in advance (more specifically, a first and a second current value notification analog signals) to be outputted sequentially through the output terminal 18.

As a result, the first current value notification analog signal having a larger voltage value (for example, 4 [V]) and the second current value notification analog signal having a smaller voltage value (for example, 1.6 [V]) are sequentially inputted to the input terminal 48 of the charging device 40.

The charging control circuit 50 sequentially A/D converts the voltage values in the two kinds of correction analog signals inputted through the input terminal 48 as described above and takes in the A/D converted voltage values. Then, the charging control circuit 50 measures the voltage values, and causes detected data, i.e., a result of the measurement, to be outputted from the communication terminal 44 using at least one digital signal.

That is, the charging control circuit 50 notifies the result of the measurement of the voltage values in the above-described two kinds of correction analog signals to the battery control circuit 30 using the at least one digital signal.

Then, the battery control circuit 30 calculates at least one analog signal correction value for correcting the voltage values in the analog signals from a difference between the voltage values in the two kinds of correction analog signals notified from the charging control circuit 50 and the two original voltage values (for example, 4 [V] and 1.6 [V]) caused to be outputted through the output terminal 18.

Specifically, for example, in order that the original voltage values are detected by the charging control circuit 50, the battery control circuit 30 calculates, from the above-described difference, a correction factor (in other words, a gain) and a correction value (in other words, an offset) for correcting the voltage values in the analog signals caused to be outputted through the output terminal 18, as the analog signal correction values.

Then, in S162 in FIG. 9, the thus-calculated analog signal correction values are utilized to set the voltage value in the analog signal, which is the maximum charging current value notification signal, from the value of the maximum charging current calculated in S150.

Specifically, in S162, the analog signal, i.e., the maximum charging current value notification signal, is outputted to the charging device 40. In setting the voltage value in the analog signal, the voltage value in the analog signal is set similarly to S160 in FIG. 6, and then the set voltage value is corrected using the analog signal correction values.

Consequently, the charging control circuit 50 can detect the value of the maximum charging current set in the battery pack 2 more accurately by A/D converting the voltage value in the analog signal outputted from the battery pack 2 and reading the A/D converted voltage value.

After the battery control circuit 30 notifies the value of the maximum charging current to the charging control circuit 50 using the analog signal in S162, the process shifts to S164, where the battery control circuit 30 determines whether it is a digital notification timing, at which the value of the charging current at the time is to be notified as digital data.

If it is determined to be the digital notification timing, the battery control circuit 30 calculates, in S166, a value of a minimum charging current to be flowed when charging the battery 10 on the basis of the battery temperature, the usage history, and so on, and the process shifts to S168.

In S168, the battery control circuit 30 causes the digital data of the value of the maximum charging current calculated in S150 and the value of the minimum charging current calculated in S166 to be outputted through the communication terminal 14 using the digital signal, to thereby notify these charging current values to the charging control circuit 50 using the digital signal.

After the battery control circuit 30 notifies the above-described respective charging current values in S168, or if it is determined not to be the digital notification timing at present in S164, the process shifts to S170.

As described above, in the present modified example, the battery control circuit 30 not only notifies the value of the maximum charging current to the charging control circuit 50 using the analog signal, but also notifies the value of the maximum charging current and the value of the minimum charging current using the digital signal.

On the other hand, if the charging control circuit 50 determines in S230 that the battery pack 2 is coupled to the charging device 40, the process shifts to S241, where the charging control circuit 50 receives the charging current value notification analog signal inputted from the battery pack 2 through the input terminal 48.

Subsequently, in S242, the charging control circuit 50 receives the charging current value notification digital signal inputted from the battery pack 2 through the communication terminal 14.

Then, in S243, the charging control circuit 50 determines whether the value of the maximum charging current obtained from the voltage value in the charging current value notification analog signal received in S241 is larger than the value of the maximum charging current obtained from the charging current value notification digital signal received in S242.

In S243, if the value of the maximum charging current obtained from the analog signal is determined to be larger than the value of the maximum charging current obtained from the digital signal, the process shifts to S244. If not, the process shifts to S245.

In S244, the charging control circuit 50 adopts the value of the maximum charging current notified by the digital signal as an upper limit of an output current at charging (in other words, the charging current). In S245, the charging control circuit 50 adopts the value of the maximum charging current notified by the analog signal as the upper limit of the output current at charging.

That is, in the charging device 40, a smaller current value of the values of the maximum charging current notified in two lines using the analog signal and the digital signal from the battery pack 2 is set as the upper limit of the output current at charging. Alternatively, a larger current value of the values of the maximum charging current notified in two lines may be set as the upper limit of the output current at charging.

Subsequently, in S246, the value of the minimum charging current obtained from the charging current value notification digital signal received in S242 is adopted as a lower limit of the output current at charging.

Then, the value of the maximum charging current and the value of the minimum charging current respectively adopted as the upper limit and the lower limit of the output current as described above are utilized to respectively restrict the upper limit and the lower limit of the value of the charging current when calculating the value of the charging current to the battery 10 in S250.

Consequently, according to the present modified example, the upper limit of the value of the charging current to the battery 10 is restricted more reliably.

Further, for example, when the battery 10 is charged and the value of the maximum charging current notified by the analog signal becomes smaller, the value of the maximum charging current could be lower than the value of the minimum charging current due to variation in the circuit configuration and so on.

However, in the present modified example, the value of the minimum charging current is notified by the digital signal, and thus, it can be inhibited that the value of the charging current becomes lower than the value of the minimum charging current to thereby prohibit normal charging of the battery 10.

In the present modified example, in the process for correcting the charging current value notification analog signal shown in FIG. 11, the correction values for the voltage value in the analog signal used to notify the value of the maximum charging current from the battery pack 2 to the charging device 40 are calculated.

However, the process for correcting the charging current value notification analog signal can be utilized for a system in which desired information is notified from the battery pack 2 to the charging device 40 using the voltage value in the analog signal, in a manner similar to the present modified example.

Specifically, even in a case where the information on, for example, the battery voltage, the battery temperature, and/or the like is notified from the battery pack 2 to the charging device 40 using the analog signal, the voltage value in the analog signal may be corrected using the correction values calculated through a process similar to the process for correcting the charging current value notification analog signal. In this way, the desired information is notified more accurately from the battery pack 2 to the charging device 40.

Next, in the above-described embodiment, the battery pack 2 is used by being attached to the electric power tool. However, the battery device of the present disclosure may be attached to an electrical appliance other than the electric power tool or may be built into an electrical appliance of various types.

What is claimed is:

1. A battery device comprising:
a battery configured to be chargeable and dischargeable;
a detection unit configured to detect a state of the battery; and
a control unit configured: to calculate, on the basis of the state of the battery detected by the detection unit, a value of a maximum charging current that can be supplied to the battery; and to notify a result of such calculation to a charging device,
wherein the control unit is configured to repeatedly calculate the value of the maximum charging current and notify the calculated value of the maximum charging current to the charging device until the battery device is detached from the charging device or until charging of the battery by the charging device is completed, and
wherein the control unit is configured, based on the result of calculation of the value of the maximum charging current, to output repeatedly to the charging device at least one analog signal in which a voltage value varies according to the value of the maximum charging current, and is configured to output to the charging device at least one digital signal for communication for controlling charging of the battery.

2. The battery device according to claim 1,
wherein the detection unit is configured to detect at least one of a battery voltage, a battery temperature, or a usage history of the battery as the state of the battery.

3. The battery device according to claim 1,
wherein the control unit is configured to set the voltage value in the at least one analog signal indicating the value of the maximum charging current, in a range narrower than a range of an input voltage of the charging device.

4. The battery device according to claim 1,
wherein the control unit is configured to set the voltage value in the at least one analog signal using a function having the value of the maximum charging current as a variable.

5. The battery device according to claim 1,
wherein the control unit is configured to notify to the charging device a parameter required to convert the voltage value in the at least one analog signal to the value of the maximum charging current.

6. The battery device according to claim 1,
wherein the control unit is configured to set the voltage value in the at least one analog signal by using a linear function having the value of the maximum charging current as a variable.

7. The battery device according to claim 1,
wherein the control unit is configured: to obtain, from the charging device, a parameter required to convert the voltage value in the at least one analog signal; and to set the voltage value in the at least one analog signal to be outputted to the charging device using the obtained parameter.

8. The battery device according to claim 1,
wherein the control unit is configured: to output, to the charging device, a plurality of correction analog signals having different voltage values as the at least one analog signal; to obtain detection data of the voltage values in the plurality of correction analog signals detected by the charging device after such output, from the charging device by at least one digital signal; to calculate at least one correction value for correcting the voltage value in the at least one analog signal so that the obtained detection data become data indicating a specified voltage value; and to correct the voltage value in the at least one analog signal using the at least one correction value when the at least one analog signal indicating the value of the maximum charging current is outputted.

9. The battery device according to claim 1,
wherein the control unit is configured to output to the charging device the at least one digital signal indicating the value of the maximum charging current.

10. The battery device according to claim 1,
wherein the control unit is configured to notify to the charging device the value of the maximum charging current and a value of a minimum charging current to be supplied to the battery during charging of the battery, using the at least one digital signal.

11. A charging device comprising:
a charging power-supply unit configured to be capable of controlling a charging current to a battery; and
a control unit configured to control the charging current to be supplied from the charging power-supply unit to the battery,
wherein the control unit is configured to control the charging current on the basis of a value of a maximum charging current repeatedly notified from a battery device provided with the battery until the battery device is detached from the charging device or until charging of the battery by the charging device is completed, and
wherein the control unit is configured to repeatedly obtain the value of the maximum charging current from at least one analog signal inputted from the battery device, to perform communication for controlling charging of the battery using at least one digital signal inputted from the battery device, and to control the charging current on the basis of the value of the maximum charging current obtained and the communication.

12. The charging device according to claim 11,
wherein the control unit is configured to notify to the battery device a conversion parameter required for calculating the value of the maximum charging current from a voltage value in the at least one analog signal.

13. The charging device according to claim 12,
wherein the control unit is configured, when at least one correction analog signal is inputted from the battery device, to notify detection data of a voltage value in the at least one correction analog signal to the battery device using at least one digital signal.

14. The charging device according to claim 11,
wherein the control unit is configured: to obtain the value of the maximum charging current from the at least one analog signal inputted from the battery device; to obtain the value of the maximum charging current from the at least one digital signal inputted from the battery device; and to control the charging current on the basis of one of the obtained values of the maximum charging current.

15. The charging device according to claim 14,
wherein the control unit is configured: to obtain a value of a minimum charging current from the at least one digital signal inputted from the battery device; and to control the charging current on the basis of the value of the minimum charging current.

16. The charging device according to claim 11, further comprising a state detection unit configured to detect a state of the charging device,
wherein the control unit is configured to control the charging current on the basis of the state of the charging device detected by the state detection unit, in a range not exceeding the value of the maximum charging current notified from the battery device.

17. The charging device according to claim 16,
wherein the state detection unit is configured to detect at least one of a temperature within the charging device, a temperature of a component provided to the charging device, or a power-supply voltage supplied from an external power supply to the charging device as the state of the charging device.

18. The charging device according to claim 11,
wherein the control unit is configured to obtain a parameter required to convert a voltage value in the at least one analog signal to the value of the maximum charging current.

19. A battery device comprising:
a battery configured to be chargeable and dischargeable;
a detection unit configured to detect a state of the battery; and
a control unit configured: to calculate, on the basis of the state of the battery detected by the detection unit, a value of a maximum charging current that can be supplied to the battery during charging of the battery; and to notify a result of such calculation to a charging device,
wherein the control unit is configured to output to the charging device at least one analog signal in which a voltage value varies according to the value of the maximum charging current, and
wherein the control unit is configured: to output, to the charging device, a plurality of correction analog signals having different voltage values as the at least one analog signal; to obtain detection data of the voltage values in the plurality of correction analog signals detected by the charging device after such output, from the charging device by at least one digital signal; to calculate at least one correction value for correcting the voltage value in the at least one analog signal so that the obtained detection data become data indicating a specified voltage value; and to correct the voltage value in the at least one analog signal using the at least one correction value when the at least one analog signal indicating the value of the maximum charging current is outputted.

20. A charging device comprising:
a charging power-supply unit configured to be capable of controlling a charging current to a battery; and
a control unit configured to control the charging current to be supplied from the charging power-supply unit to the battery,
wherein the control unit is configured to control the charging current on the basis of a value of a maximum charging current notified from a battery device provided with the battery,
wherein the control unit is configured: to calculate the value of the maximum charging current from a voltage value in at least one analog signal inputted from the battery device; and to notify to the battery device a conversion parameter required for calculating the value of the maximum charging current from the voltage value in the at least one analog signal, and
wherein the control unit is configured, when at least one correction analog signal is inputted from the battery device, to notify detection data of a voltage value in the at least one correction analog signal to the battery device using at least one digital signal.

* * * * *